UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

PRESSURE-DIFFERENCE-CREATING DEVICE.

1,298,471.  Specification of Letters Patent.  Patented Mar. 25, 1919.

Application filed July 16, 1917. Serial No. 180,712.

*To all whom it may concern:*

Be it known that I, AUSTIN R. DODGE, a citizen of the United States, residing at Schenectady, in the county of Schenectady, State of New York, have invented certain new and useful Improvements in Pressure-Difference-Creating Devices, of which the following is a specification.

The present invention relates to pressure difference creating apparatus or devices, such as are associated with a conduit through which a fluid flows and which creat a pressure difference which bears a definite relation to the rate of flow. One of the principal applications for pressure difference creating devices of this type is in connection with flow meters, the leading and trailing pressure pipes in such case being connected to a suitable U-tube manometer or similar instrument for indicating, or indicating and recording, the pressure differences set up. Such devices may, however, find other applications being adapted for use wherever it may be desired to utilize a pressure difference which bears a definite relation to the rate of flow of fluid through a conduit. The invention relates particularly to a pressure difference creating apparatus or device of the so-termed "orifice" type which consists of a disk which extends across the conduit and has an opening through it of lesser diameter than the conduit. This forms a restricted passage in the conduit, and the leading and trailing pressures are taken off from the up-stream and down-stream sides of the disk respectively, as is well understood.

The object of my invention is to provide an improved structure in a pressure difference creating apparatus or device of this type.

The object of my invention is to provide an improved structure in a metering apparatus of this type.

For a consideration of what I believe to be novel and my invention, attention is directed to the accompanying specification and the claims appended thereto.

Figure 1:
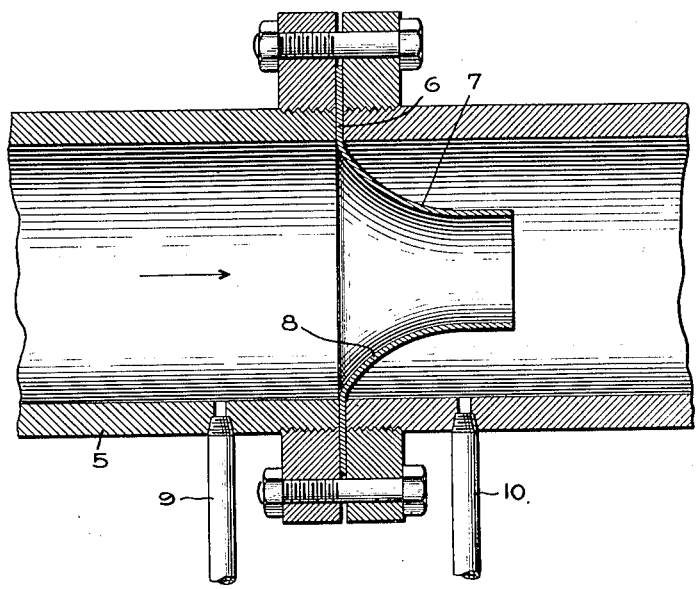
Figure 2:
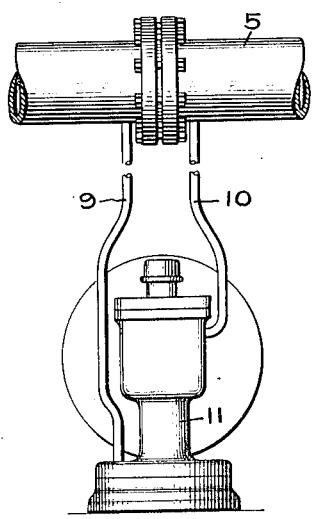

In the accompanying drawing, Figure 1 is a sectional view of a pressure difference creating device illustrating my invention; Fig. 2 is a view showing the device of Fig. 1 connected to an indicating or indicating and recording instrument, and Fig. 3 is a diagram illustrating the operation of the apparatus.

Heretofore it has been the custom to employ an orifice comprising a flat annular disk arranged in the conduit, for example, between the adjacent ends of two pipe sections, and to connect the leading and trailing pressure pipes through openings in the conduit, one on each side of the disk.

With such an arrangement it has been found that the pressures existing at different points in the vicinity of the orifice vary considerably. On the up-stream side of the disk the uniformity of the stream lines is disturbed due to the restriction in the conduit and the sharp edge of the orifice, and eddy currents are set up, the result being in general an increase in the pressure adjacent the up-stream side of the disk. For accurate uniform results with a meter, therefore, the up-stream connection must be made sufficiently far from the disk to avoid this region of disturbed flow.

Figure 3:
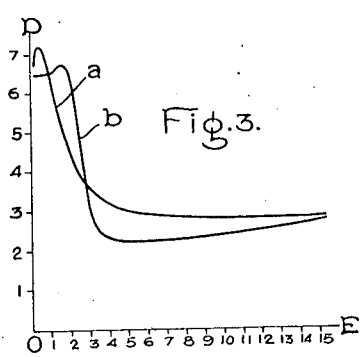

On the down-stream side of the disk the pressure in the vicinity of the disk in the case where the disk has an opening of substantial size as compared to the pipe diameter is illustrated by the curve $a$ in Fig. 3. In this figure the vertical line OD represents the plane of the disk and the scale adjacent it is laid off to represent pressure drop in inches of vertical mercury deflection between the two sides of the disk. The up-stream pressure is practically constant at the point of connection of the leading pipe irrespective of the flow. The line OE represents distance along the conduit from the disk and is laid off in inches. Referring to this curve it will be seen that the pressure drop gradually increases from a point close to the disk to a point somewhat removed therefrom where it reaches a maximum value, after which it decreases again very rapidly, a substantial portion of the pressure lost being again regained.

The down-stream connection can, of course, be made at any point on this curve, and when calibrated, the indicating instrument will give an indication of the flow. In commercial practice where a large number of similar meters is installed, it is desirable to calibrate the meter for the different sizes of conduits met with and use this calibration for all installations, the installations in each case being duplicated. This means that the connection of the trailing pressure pipe on the down-stream side of the orifice disk must in each case be located exactly the calibrated distance from the disk, since the pressure drop curve varies continuously in the vicinity of the disk. In actual practice in installing meters for commercial use this is very difficult to do and even with the exercise of great care, errors occur which render the readings of the meter inaccurate and hence require a special calibration of the particular meter.

It is preferable to locate the trailing pipe connection at the peak of the curve as this gives the greatest pressure difference to work with, and also because the curve is flattest at this point, but even here, as is clear from the curve $a$ in Fig. 3, a variation of a small amount in either direction will materially affect the calibration of the meter.

Furthermore, such disks are likely to warp and if this occurs it means the readings of the meter will be rendered inaccurate.

I have found by careful experiments and tests that the above referred to difficulty may be overcome by providing the orifice on its down-stream side with a suitably formed nozzle, or in other words, by making the orifice in the form of a nozzle with its small end pointing down-stream. With such an arrangement I have found that the pressure drop is substantially the same at all points in the space between the down-stream side of the disk and the end of the nozzle. With this arrangement, accordingly, the connection of the trailing pipe to the conduit may be located at any point within such space. This eliminates the necessity of exercising extreme care in locating such connection. The curve $b$ in Fig. 3 illustrates the pressure conditions which are found to exist in the case of my flow nozzle. It will be noted that the curve is substantially flat for some distance, after which it rises somewhat and then drops.

It will be understood, of course, that the values given to the curves in Fig. 3 are those determined under certain specific conditions, and are only by way of illustration. The curves, however, are typical of the conditions found in connection with the old arrangement referred to and my improved arrangement in all instances.

Referring now to Figs. 1 and 2, 5 indicates a conduit through which the fluid to be metered flows, the arrow therein indicating the direction of flow. Supported in the conduit as by having its periphery clamped between the ends of two adjacent conduit sections is an annular disk 6 having a nozzle 7 located on the down-stream side thereof. The nozzle is of greater diameter at the disk than at its free end and is gradually curved as indicated at 8 so as to direct the flowing fluid in a smooth even manner. 9 indicates the leading pressure pipe and 10 the trailing pressure pipe, the same leading to a suitable indicating or indicating and recording instrument conventionally illustrated at 11.

With this arrangement, as already stated, the trailing pressure pipe 10 may be connected at any point between the disk 6 and the end of nozzle 7, and it is shown as so located. It has also been found that with a flow nozzle, as illustrated, the conditions of flow are much less disturbed on the up-stream side of the disk 6 than is the case with a plain disk, and the connection of the leading pressure pipe 9 may accordingly be made much closer to the disk 6 without disturbing the accuracy of the meter, which is often of advantage in commercial installations. The use of a flow nozzle also has the advantage that it will carry or pass about twice as much flow as a flat disk with the same sized opening. Due to this, the flow nozzle opening for any given flow need be but about one-half the size required in the case of a flat disk. As a result the flow nozzle will be stronger. Furthermore, due to its cylindrical shape the flow nozzle as described is not likely to warp.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a conduit through which a fluid flows, of an apparatus associated with the conduit for setting up a pressure difference which bears a definite relation to the rate of flow through the conduit, said apparatus comprising a flow nozzle in the conduit which points in the direction of flow and has a flange, a leading pressure pipe connected to the conduit on the up-stream side of said flange, and a trailing pressure pipe connected to the conduit on the down-stream side of said flange, said trailing pressure pipe connection being located between said flange and the discharge end of the flow nozzle.

2. The combination of a conduit through which a fluid flows, an apertured disk extending transversely of the conduit and forming an orifice, a nozzle carried by the disk and pointing in the direction of the flow of fluid in the conduit, and leading and trailing pressure pipes connected to the conduit on opposite sides of the orifice disk, the point of connection of the trailing pressure pipe to the conduit being between the disk and the end of said nozzle.

3. In an apparatus of the character described, the combination of a conduit through which a fluid to be metered flows, an apertured disk extending transversely of the conduit and forming an orifice, a nozzle carried by the disk and pointing in the direction of the flow of fluid in the conduit, a pressure responsive mechanism, and leading and trailing pressure pipes connecting said mechanism to the conduit on opposite sides of the orifice disk, the point of connection of the trailing pressure pipe to the conduit being between the disk and the end of said nozzle.

4. In an apparatus of the character described, the combination of a conduit through which a fluid to be metered flows, a flow nozzle in the conduit having a flange and a gradually curved admission end which serves to smoothly and evenly direct the flowing fluid to the discharge end of the flow nozzle, a manometer, and leading and trailing pressure pipes connecting the manometer to the conduit on the up-stream and down-stream ends of the nozzle, said trailing pressure pipe connection being located between said flange and the discharge end of the flow nozzle.

In witness whereof, I have hereunto set my hand this 14th day of July 1917.

AUSTIN R. DODGE.